United States Patent
Brauer et al.

(10) Patent No.: US 7,976,220 B2
(45) Date of Patent: Jul. 12, 2011

(54) FILM BAG

(75) Inventors: Jochen Brauer, Lohne (DE); Marcus Kujat, Osnabrück (DE); Alfons Kruse, Dinklage (DE)

(73) Assignee: Nordenia Deutschland Halle GmbH, Halle (DE)

( * ) Notice: Subject to any disclaimer, the term of this patent is extended or adjusted under 35 U.S.C. 154(b) by 1049 days.

(21) Appl. No.: 11/823,245

(22) Filed: Jun. 27, 2007

(65) Prior Publication Data

US 2008/0008404 A1 Jan. 10, 2008

(30) Foreign Application Priority Data

Jun. 28, 2006 (DE) .................... 10 2006 029 893

(51) Int. Cl.
*B65D 33/00* (2006.01)
*B65D 33/16* (2006.01)
*B65D 30/20* (2006.01)

(52) U.S. Cl. ......... 383/204; 383/61.2; 383/63; 383/120; 383/906

(58) Field of Classification Search ................. 383/61.2, 383/203, 204, 120, 63, 906
See application file for complete search history.

(56) References Cited

U.S. PATENT DOCUMENTS

| | | | | |
|---|---|---|---|---|
| 4,332,344 | A * | 6/1982 | Strodthoff | 383/63 |
| 5,547,284 | A * | 8/1996 | Imer | 383/104 |
| 6,193,416 | B1 * | 2/2001 | Kawamata et al. | 383/104 |
| 6,820,391 | B2 * | 11/2004 | Barmore et al. | 53/133.4 |
| 6,971,794 | B2 * | 12/2005 | Yeager | 383/61.2 |
| 6,986,920 | B2 * | 1/2006 | Forman et al. | 428/34.1 |
| 7,040,810 | B2 * | 5/2006 | Steele | 383/66 |
| 2007/0230834 | A1 * | 10/2007 | Schneider | 383/64 |
| 2008/0008406 | A1 * | 1/2008 | Russell et al. | 383/63 |

FOREIGN PATENT DOCUMENTS

DE 201 15 181 U1 7/2002
WO WO 2004/092025 10/2004
* cited by examiner

*Primary Examiner* — Jes F Pascua
(74) *Attorney, Agent, or Firm* — Collard & Roe, P.C.

(57) ABSTRACT

A film bag formed by folding a film has a front surface, a back surface, a laid-in first side fold, and a laid-in second side fold. The bag is closed off by a longitudinal sealing seam and a head sealing seam. The head sealing seam has a step shape, with a first head sealing seam segment extending from the outside edge of the second side fold to the ends of the re-closure strip attached to the inside of the front and back surfaces, and a second head sealing seam segment that follows the first in step shape and connects a bag segment that projects upward, at the edges, forming a seal, and extends to the outside edge of the bag, along the first side fold. The projecting bag segment can be removed entirely or in part, along a separating line disposed above the re-closure strip.

11 Claims, 3 Drawing Sheets

FILM BAG

CROSS REFERENCE TO RELATED APPLICATIONS

Applicants claim priority under 35 U.S.C. §119 of German Application No. 10 2006 029 893.4 filed Jun. 28, 2006.

BACKGROUND OF THE INVENTION

1. Field of the Invention

The present invention relates to a film bag that is formed by means of folding a film, has a front surface, a back surface, a laid-in first side fold as well as a laid-in second side fold, and is closed off by means of a longitudinal sealing seam as well as a head sealing seam. A re-closure strip is attached on the inside surface of the film bag, below the head sealing seam, which strip releasably connects the first side fold with the adjacent front surface and back surface of the bag. The first side fold forms a re-closable chute when a bag segment is cut off or torn into above the re-closure strip to remove goods filled into the bag.

Film bags having the structure indicated are suitable for packaging bulk goods, for example dry food for animals, and have a re-closure that makes it possible to pour out, i.e. remove the content of the packaging in partial amounts, in other words in portions. Removal takes place through an opening in the first side fold, whereby the side fold can be pulled out after the re-closure has been opened, and can be used as a chute. The opening is re-closable. The re-closure can be configured as a so-called zipper closure that has strip-shaped groove and tongue elements that can be manually connected with one another, under pressure, and then form a catch connection or clip connection. Other re-closures, e.g. hook-and-loop closures or re-closures having a self-adhesive strip, are also possible.

2. The Prior Art

A film bag having the characteristics described initially is known from WO 2004/092025 A2. It consists of a film folded into a tube. The tube, produced by folding, has laid-in side folds and is closed off on the mantle side by means of a longitudinal sealing seam. A re-closure strip is attached on the inside surface of the film bag; it releasably connects one of the side folds with the adjacent front and back surface of the bag. The re-closure strip is longer than the width of the side fold and is attached to the insides of the side fold to the adjacent bag surfaces that form the front and back surface of the bag. The head sealing seam closes off the upper edge of the film bag and extends, as a straight sealing seam, over the entire width of the film bag.

For first-time use, a bag segment above the re-closure disposed on the inside of the bag must be removed along a weakening line or a marking imprinted on the outside of the bag. Without printed information, it is not evident to a user how and on what side the closed film bag must be opened. The correct handling is not intuitively evident. Furthermore, it is disadvantageous that after the film segment has been removed, an opening forms in the film bag, which extends vertically from the re-closure up to the upper edge of the film bag, and cannot be closed again. Another disadvantage is the unsatisfactory shape stability of the film bag. During use, the chute opens very far, whereby the bag loses its shape, to a great extent, on the removal side. Because of the low shape stability, handling of the opened bag is difficult. Particularly in the case of large bags, handling of the opened bag and metered removal of the goods filled into it require significant skill on the part of the user.

A side fold bag having a re-closable removal opening in a side fold is also known from DE 201 15 181 U1. The head sealing seam is a straight seam and closes off the upper edge of the film bag. Therefore, with this bag as well, it is not easily evident how and at what location the film bag must be opened for first-time use.

Parallel to the head sealing seam, another horizontal seam is provided, which extends from the outside of the second side fold to the ends of the re-closure strip attached to the inside of the front and back surface. Because this sealing seam is adjacent to the ends of the re-closure, the bag is relatively tight when the re-closure is closed, even in use. The side folds consist of separate film strips folded in V shape, which are laid in between the front surface and back surface of the bag and connected with these surfaces by longitudinal sealing seams. Broad seams are necessary in order to seal the film bag, which form outside edges of the bag that are rigid in shape and impart good shape stability to the film bag. It is a disadvantage that the sealing seams significantly restrict the opening width of the re-closure, which makes the removal of goods filled into the bag difficult, particularly in the case of larger pieces.

SUMMARY OF THE INVENTION

With this background, it is an object of the invention to provide a side fold bag having a re-closable removal opening disposed in the region of a side fold, which can be intuitively opened for first-time use. Furthermore, the bag should be stable in shape during use and be easy to handle.

These and other objects are achieved, according to the invention, by means of a film bag in which the head sealing seam is configured in step shape. A first segment of the head sealing seam extends from the outside edge of the second side fold all the way to the ends of the re-closure strip attached to the inside of the front and back surfaces. The head sealing seam has a second segment that follows the first in step shape, which connects a bag segment that projects upward, at the edges, forming a seal, and extends all the way to the outside edge of the bag, along the first side fold. The projecting bag segment can be removed entirely or in part, along a separating line disposed above the re-closure strip. The bag is opened for first-time use by means of removing the projecting bag segment or a head-side part of the bag segment. The laid-in side fold forms a re-closable chute.

It is intuitively evident to the user that the bag segment that projects upward must be removed in order to open the film bag for the first time. Even so, cutting lines may be imprinted on the outside of the film bag to facilitate handling. In a configuration that is very advantageous with regard to handling, the separating line for removing the projecting bag segment is made up of a perforation line or of a weakening line produced using a laser method. The laser seam is preferably superimposed on an embossing line produced via heat sealing. The placement of a weakening line produced using a laser method is a particularly good possibility if the film bag is made up of a multi-layer laminate film having an outside layer of polyester and an inner polyolefin layer. Only the outer polyester layer is partially removed via the laser method. The inner polyolefin layer remains unharmed and guarantees that the bag, still with its original seal, remains tight. The re-closure is exposed by removing the projecting bag segment. After the re-closure has been exposed, the side fold can be flipped out as a chute, whereby a chute opening is formed that is about twice as long as the width of the side fold. The large opening facilitates the removal of goods filled into the bag having a larger piece size.

The re-closure strip preferably forms a zipper closure and has a film support that can be attached to the inside surface of the bag and closure elements that are formed onto the film support. The strip-shaped closure elements can be manually locked into one another in the manner of a tongue and groove connection, by means of pressure. The film support is connected with the film forming the film bag by means of at least one sealing seam, and preferably with two sealing seams, which are disposed on both sides of the strip-shaped closure elements.

The film bags are produced as bags that are laid flat, and only filled with filled-in goods subsequently, in filling systems; the goods are filled in through an opening on the bottom for example, or—before the head sealing seams are made—at the upper end of the bag. For transport, the film bags, laid flat, are stacked. In this connection, the re-closure elements are severely bent at the folding or bending edges of the film bag. The re-closure strip for a zipper closure possesses significant elastic recovery forces that counteract bending. As a result, the laid-flat film bags spread open in the region of the first side fold. With an increasing stacked height, the risk then occurs that the bags stacked on top of one another will slip. In order to avoid such slipping, the strip-shaped closure elements of the re-closure strip are interrupted at the bending edges of the film bag via a punched-out region or a cut, according to a preferred embodiment of the invention. In the production of the film bag, the closure strip is punched or cut at the location at which the bending edge of the side fold will later be situated, i.e. where the film web will be folded, after it has been applied to a film web that is still flat, at first.

There are several possibilities with regard to application of the re-closure strip. In one embodiment, the length of the re-closure strip is greater than the width of the first side fold. In this embodiment, a center segment of the re-closure strip is attached to the inside surface of the side fold, and end segments of the re-closure strip that follow on both sides are connected with the insides of the front surface and the back surface, respectively, of the bag. The re-closure strip can be configured as a hook-and-loop strip, as a strip having a self-adhesive surface, or as a zipper closure whose shape closure elements can be connected with one another. Another embodiment of the invention provides that the re-closure strip that is attached to the inside surface of the first side fold has a length corresponding to the width of the side fold and extends all the way to the outside edges of the bag, and that closure strips are attached to the insides of the front surface and the back surface, which interact with the re-closure strip affixed to the first side fold. Suitable profiles for the re-closure strips and closure strips are described in DE 201 15 181 U1.

The first side fold preferably extends all the way to the head sealing seam. In the case of this embodiment, part of the projecting bag segment with the laid-in side fold can be removed along the separating line.

The second segment of the head sealing seam is preferably composed of a vertical sealing seam and a crosswise sealing seam. The vertical sealing seam extends parallel to the side fold and connects the front surface with the back surface of the film bag. The crosswise sealing seam extends from the upper end of the vertical sealing seam all the way to the outside edge of the film bag.

The first segment of the head sealing seam, which extends from the outside edge of the second side fold all the way to the ends of the re-closure strip, borders directly onto the ends of the re-closure strip, so that no disruptive opening forms between the re-closure and the part of the head sealing seam that remains after the projecting bag segment has been removed. The re-closable film bag is therefore relatively tight even in use. The first segment of the head sealing seam, which extends from the outside edge of the second side fold all the way to the ends of the re-closure strip, can have a connecting region for the ends of the re-closure strip. This connecting region is configured as a short vertical connecting seam between the front and back surface. In this embodiment, the re-closure strip may be disposed somewhat lower than the first segment of the head sealing seam.

According to a preferred embodiment of the invention, the outside edges between the first side fold and the adjacent front and back surface are made of folded edges that are reinforced by longitudinal sealing seams. The longitudinal sealing seams extend all the way to the head sealing seam and are preferably interrupted in the region of the re-closure strip. Longitudinal sealing seams provided for reinforcing the edges impart significant shape stability to the film bag even in the open state, so that good handling is guaranteed even in the case of large film bags. Possible interruptions of the longitudinal sealing seams, particularly in the region of the re-closure strip, have no detrimental effect on the tightness of the film bag, because the outside edges of the first side fold are fold edges and the longitudinal sealing seams that are additionally made do not possess a sealing function.

According to an advantageous embodiment of the invention, all four outside edges of the film bag are reinforced by means of longitudinal sealing seams. The longitudinal sealing seam that closes the film bag on the mantle side can be integrated into an edge that delimits the side fold. In this embodiment, the longitudinal sealing seam that closes the film bag on the mantle side connects the second side fold with the front or back surface of the bag.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
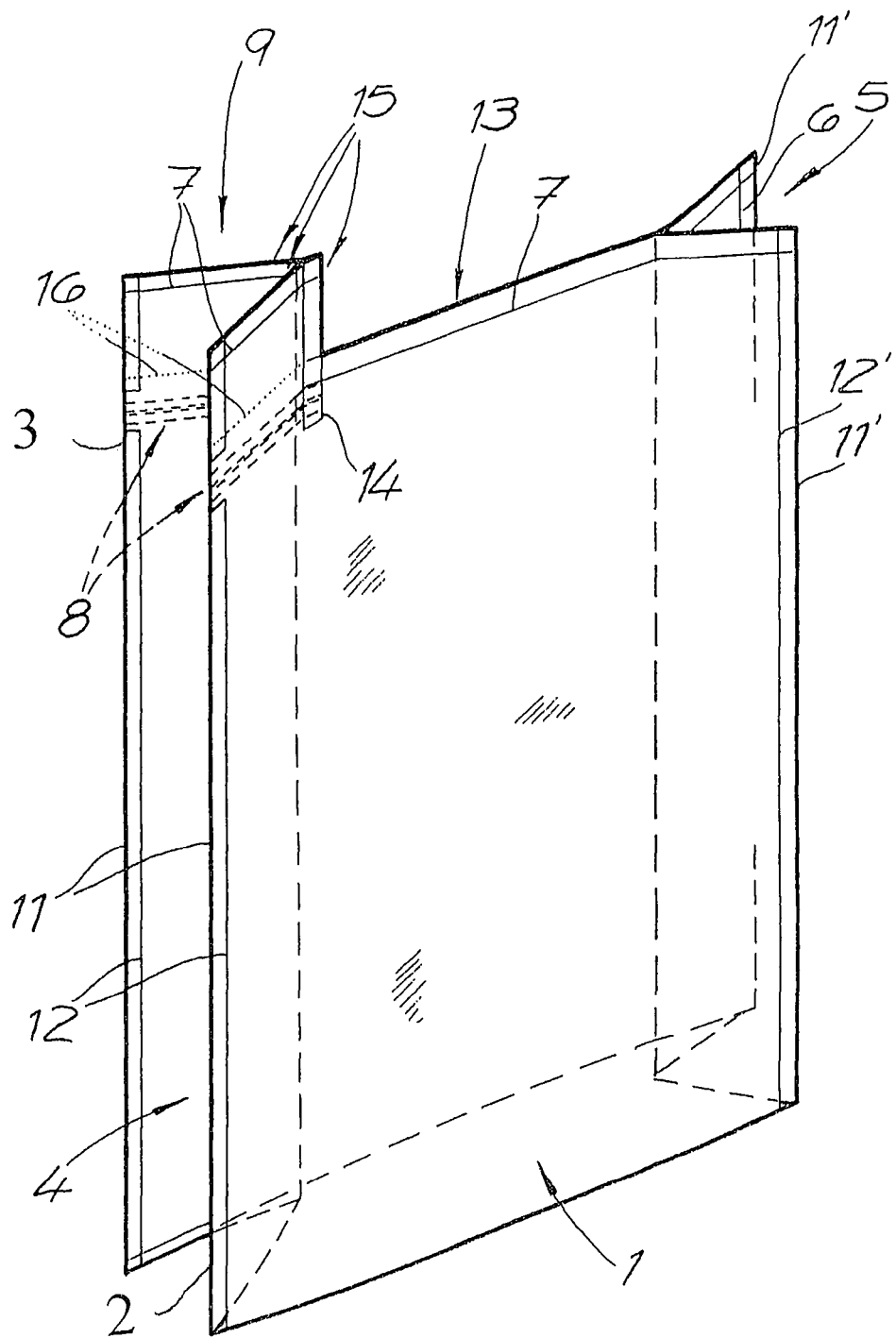
FIG. 1 is a perspective view of a side fold bag still with its original seal.
Figure 2:
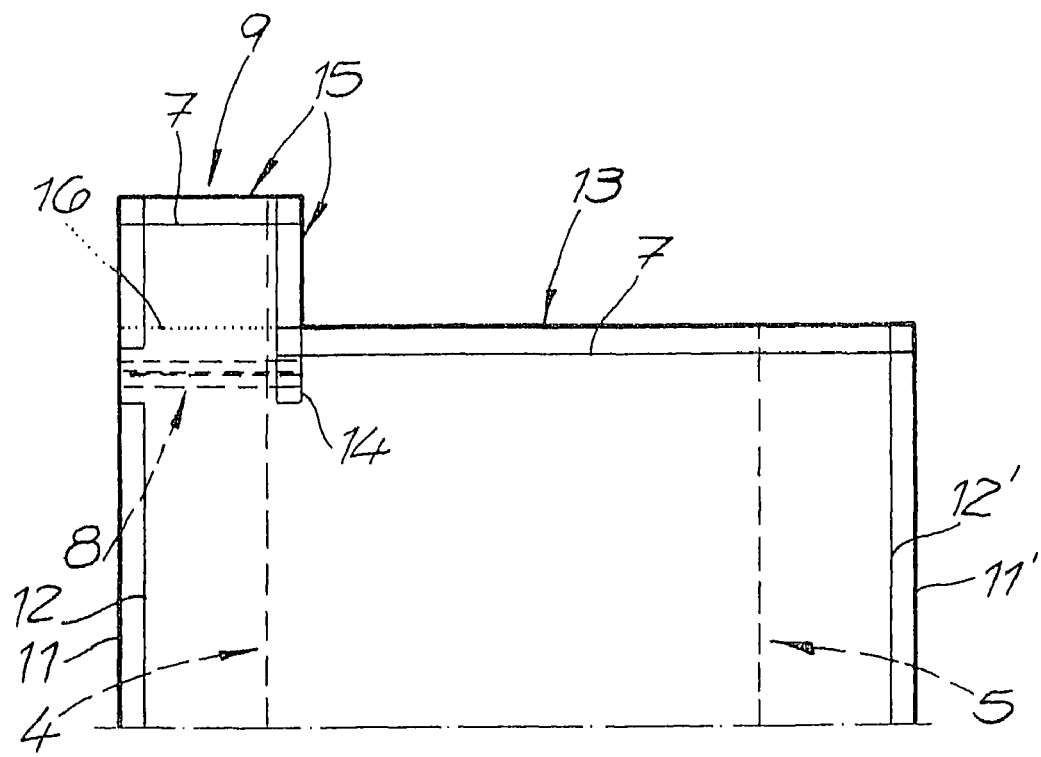
FIG. 2 is a side view of the side fold bag shown in FIG. 1.
Figure 3:
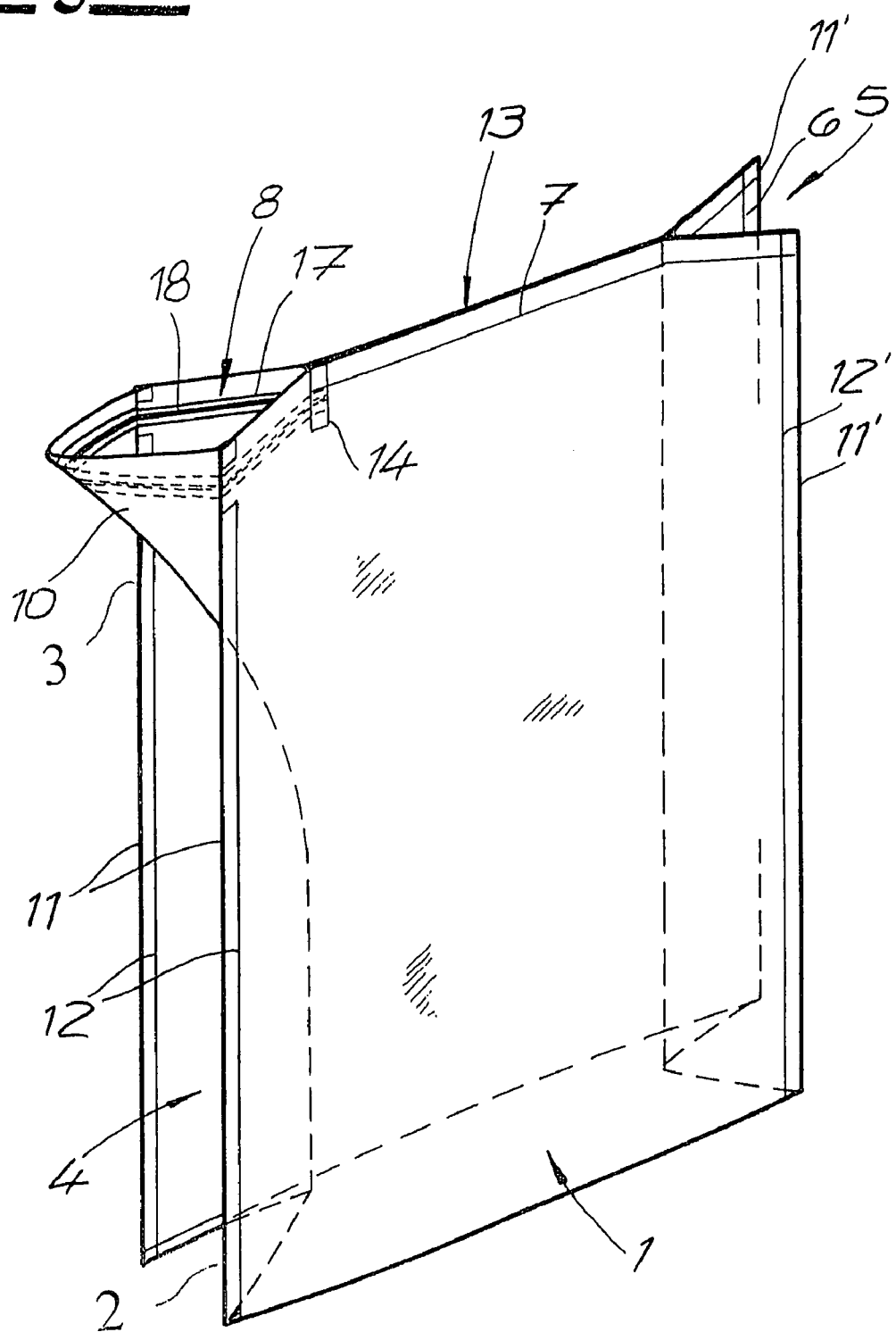
FIG. 3 is a perspective view of the side fold bag shown in FIG. 1, in the opened state.

Referring now in detail to the drawings, FIGS. 1-3 show a film bag formed by folding a film 1 and having a front surface 2, a back surface 3, a laid-in first side fold 4, as well as a laid-in second side fold 5. The film bag is closed off via a longitudinal sealing seam 6, a head sealing seam 7, and a bottom sealing seam, not shown. On the inside of head sealing seam 7, a re-closure strip 8 is attached, which releasably connects first side fold 4 with adjacent front surface 2 and back surface 3 of the bag.

In order to remove goods filled into the bag, a bag segment 9 above the re-closure strip 8 must be removed. Afterwards, first side fold 4 forms a re-closable chute 10. Outside edges 11 between first side fold 4 and adjacent front or back surface 2, 3 are made up of folded edges that are reinforced via longitudinal sealing seams 12 that run parallel. Longitudinal sealing seams 12 extend from a bottom sealing seam, not shown, all the way to head sealing seam 7, and it is practical if they are interrupted in the region of re-closure strip 8. Second side fold 5 is also delimited by outside edges 11', which are reinforced by longitudinal sealing seams 12'. Longitudinal sealing seams 12' on outside edges 11' of second side fold 5 extend from a bottom sealing seam, not shown, all the way to head sealing seam 7, without interruption. Longitudinal sealing seam 6 that closes the film bag on the mantle side is displaced into outside edge 11' of second side fold 5 and connects second side fold 5 with the front or back surface of the bag. This sealing seam 6 fulfills a sealing function, while the sealing seams assigned to the other outside edges merely reinforce folded edges and do not have any sealing function.

Head sealing seam 7 is configured in step shape. It has a first segment 13 that extends from outside edge 11' of the second side fold all the way to the ends of re-closure strip 8 attached to the inside of front and back surfaces 2, 3, and borders on the ends of the re-closure strip. First segment 13 of the head sealing seam can have a connecting region 14 for the ends of the re-closure strip 8. Connection region 13 is configured as a short, vertical connecting seam between the front and back surface. A second segment 15 follows first segment 13 of the head sealing seam, in step shape; this segment connects a bag segment 9 that projects upward, at the edges, in tight manner, and extends all the way to the outside edge of the bag along first side fold 4. Projecting bag segment 9 can be removed along a separating line 16 disposed above re-closure strip 8.

Re-closure strip 8 has a film support 17 that can be attached to the inside surface of the bag and strip-shaped closure elements 18 that are formed onto the film support. Strip-shaped closure elements 18 form a zipper closure of shape closure elements that can be locked into one another manually, by means of pressure. Strip-shaped closure elements 18 can be interrupted at the bending edges of the film bag, by means of a punched-out region or a cut. The length of re-closure strip 8 is greater than the width of first side fold 4. A center segment of the re-closure strip is attached to the inside surface of side fold 4. End segments of re-closure strip 8 that follow on both sides are connected with the insides of the front surface or the back surface, 2, 3, respectively, of the bag.

Separating line 16 for removing bag segment 9 that projects upward preferably is made up of a weakening line produced using a laser method, which weakens an outside layer of the film, made up of polyester, for example, and leaves a polyolefin inner layer of the film unharmed. The tear-open behavior of separating line 16 can be further improved if the laser seam is combined with an embossing line formed by means of heat sealing, and the laser seam and the embossing line are superimposed on one another.

Second segment 15 of head sealing seam 7 is composed of a vertical sealing seam and a crosswise sealing seam. The vertical sealing seam extends parallel to the side fold and connects the front surface with the back surface of the film bag. The crosswise sealing seam extends from the upper end of the vertical sealing seam all the way to the outside edge of the film bag.

In accordance with the exemplary embodiment shown in FIGS. 1 and 2, first side fold 4 extends all the way to head sealing seam 7. Part of projecting bag segment 9, with the laid-in side fold, can be removed along separating line 16.

Although only a few embodiments of the present invention have been shown and described, it is to be understood that many changes and modifications may be made thereunto without departing from the spirit and scope of the invention as defined in the appended claims.

What is claimed is:

1. A film bag formed from a folded film comprising:
   (a) a front surface;
   (b) a back surface;
   (c) a laid-in first side fold;
   (d) a laid-in second side fold;
   (e) a first longitudinal sealing seam;
   (f) a head sealing seam, said first longitudinal seam and said head sealing seam closing off the folded film to form the film bag having an inside surface and a first outside edge along the first side fold;
   (g) a re-closure strip attached on the inside surface below the head sealing seam, said re-closure strip having first and second ends releasably connecting the first side fold with the front surface and the back surface respectively; and
   (h) a separating line disposed above the re-closure strip;
   wherein said first side fold forms a re-closable chute when an upwardly projecting bag segment is cut off or torn into above the re-closure strip to remove goods contained in the bag;
   wherein said head sealing seam has a step shape comprising a first segment extending from a second side fold outside edge of the second side fold to the first and second ends of the re-closure strip, a second segment following the first segment in step shape, connecting the bag segment at edges of the bag segment to form a seal, and extending to the first outside edge along the first side fold;
   wherein the upwardly projecting bag segment is at least partially removable along the separating line disposed above the re-closure strip; and
   wherein the separating line comprises a combination of an embossing line formed by heat sealing and a laser seam superimposed on the embossing line.

2. The film bag according to claim 1, wherein the re-closure strip has a film support attachable to the inside surface of the bag and a plurality of strip-shaped closure elements formed onto the film support.

3. The film bag according to claim 1, wherein the re-closure strip has a length, first and second end segments, and a center segment between said end segments, said length being greater than a width of the first side fold, the center segment of the re-closure strip being attached to an inside surface of the first side fold, and the end segments of the re-closure strip being connected with inside areas of the front surface and the back surface, respectively, of the bag.

4. The film bag according to claim 1, wherein the film bag has a second outside edge and the re-closure strip has a length corresponding to a width of the first and second side folds and extends to the first and second outside edges, and wherein the film bag further comprises closure strips attached to inside areas of the front surface and the back surface, said closure strips interacting with the re-closure strip affixed to the first side fold.

5. The film bag according to claim 4, wherein the first and second outside edges between the first side fold and the front and back surfaces adjacent to the first side fold comprise folded edges reinforced by second and third longitudinal sealing seams.

6. The film bag according to claim 1, wherein the first side fold extends to the head sealing seam, and a part of the projecting bag segment having the laid-in first side fold is removable along the separating line.

7. The film bag according to claim 1, wherein the separating line comprises a perforation line.

8. The film bag according to claim 1, wherein the second segment of the head sealing seam comprises a vertical sealing seam and a crosswise sealing seam, the vertical sealing seam extending parallel to the first side fold and connecting the front surface with the back surface of the film bag, and the crosswise sealing seam extending from an upper end of the vertical sealing seam to the outside edge of the film bag.

9. The film bag according to claim 1, wherein the first segment of the head sealing seam extends from an outside edge of the second side fold to the ends of the re-closure strip and has a connecting region for the ends of the re-closure strip comprising a short vertical connecting seam between the front and back surfaces.

10. The film bag according to claim 1, wherein the first longitudinal sealing seam connects the second side fold with the front or back surface of the bag and forms a second side outside edge.

11. A film bag formed from a folded film comprising:
(a) a front surface;
(b) a back surface;
(c) a laid-in first side fold;
(d) a laid-in second side fold;
(e) a first longitudinal sealing seam;
(f) a head sealing seam, said first longitudinal seam and said head sealing seam closing off the folded film to form the film bag having an inside surface and a first outside edge along the first side fold;
(g) a re-closure strip attached on the inside surface below the head sealing seam, said re-closure strip having first and second ends releasably connecting the first side fold with the front surface and the back surface respectively; and
(h) a separating line disposed above the re-closure strip;
wherein said first side fold forms a re-closable chute when an upwardly projecting bag segment is cut off or torn into above the re-closure strip to remove goods contained in the bag;
wherein said head sealing seam has a step shape comprising a first segment extending from a second side fold outside edge of the second side fold to the first and second ends of the re-closure strip, a second segment following the first segment in step shape, connecting the bag segment at edges of the bag segment to form a seal, and extending to the first outside edge along the first side fold;
wherein the upwardly projecting bag segment is at least partially removable along the separating line disposed above the re-closure strip;
wherein the film bag has a second outside edge and the re-closure strip has a length corresponding to a width of the first and second side folds and extends to the first and second outside edges, and wherein the film bag further comprises closure strips attached to inside areas of the front surface and the back surface, said closure strips interacting with the re-closure strip affixed to the first side fold;
wherein the first and second outside edges between the first side fold and the front and back surfaces adjacent to the first side fold comprise folded edges reinforced by second and third longitudinal sealing seams; and
wherein the second and third longitudinal sealing seams extend to the head sealing seam and are interrupted near the re-closure strip.

* * * * *